(12) United States Patent
Billy

(10) Patent No.: US 10,058,090 B2
(45) Date of Patent: Aug. 28, 2018

(54) ACOUSTIC COUPLER FOR A COMBINED GAME CALL

(71) Applicant: Stephen Fayette Billy, Poteau, OK (US)

(72) Inventor: Stephen Fayette Billy, Poteau, OK (US)

( * ) Notice: Subject to any disclaimer, the term of this patent is extended or adjusted under 35 U.S.C. 154(b) by 0 days.

(21) Appl. No.: 15/410,739

(22) Filed: Jan. 19, 2017

(65) Prior Publication Data

US 2017/0231216 A1    Aug. 17, 2017

Related U.S. Application Data

(60) Provisional application No. 62/388,090, filed on Jan. 19, 2016.

(51) Int. Cl.
*A01M 31/00*    (2006.01)
*A63H 5/00*    (2006.01)

(52) U.S. Cl.
CPC ............. *A01M 31/004* (2013.01); *A63H 5/00* (2013.01)

(58) Field of Classification Search
CPC ................................ A63H 5/00; A01M 31/004
See application file for complete search history.

(56) References Cited

U.S. PATENT DOCUMENTS

| 1,085,460 | A | * | 1/1914 | Michaelis | ............ | A63H 33/101 |
| | | | | | | 446/120 |
| 2,208,049 | A | * | 7/1940 | Hamilton | ............. | A63H 33/102 |
| | | | | | | 446/102 |
| 3,469,339 | A | * | 9/1969 | Thomas | ................. | A63H 33/06 |
| | | | | | | 446/122 |
| 4,211,031 | A | | 7/1980 | Gambino | | |
| 6,435,933 | B1 | | 8/2002 | Browne | | |
| 7,918,709 | B1 | | 4/2011 | Primos et al. | | |
| 2010/0240275 | A1 | * | 9/2010 | Rowley | ............... | A01M 31/004 |
| | | | | | | 446/208 |

* cited by examiner

*Primary Examiner* — John Ricci
(74) *Attorney, Agent, or Firm* — Scott R. Zingerman; Gable Gotwals

(57) ABSTRACT

The present disclosure includes an acoustic coupler for combining at least two independent reed game calls. The acoustic coupler has a body including a first length bounded by a first end and a second end. The body includes an acoustic chamber therein and at least one aperture extending into the acoustic chamber. The first end and said second end of the body are in fluid communication with the acoustic chamber. The first reed game call is affixed to the first end of the body. An insert in the first reed game call includes an air passage which is in fluid communication with the acoustic chamber. A second reed game call is affixed to the second end of the body. The insert in the second reed game call includes an air passage which is in fluid communication with the acoustic chamber.

14 Claims, 2 Drawing Sheets

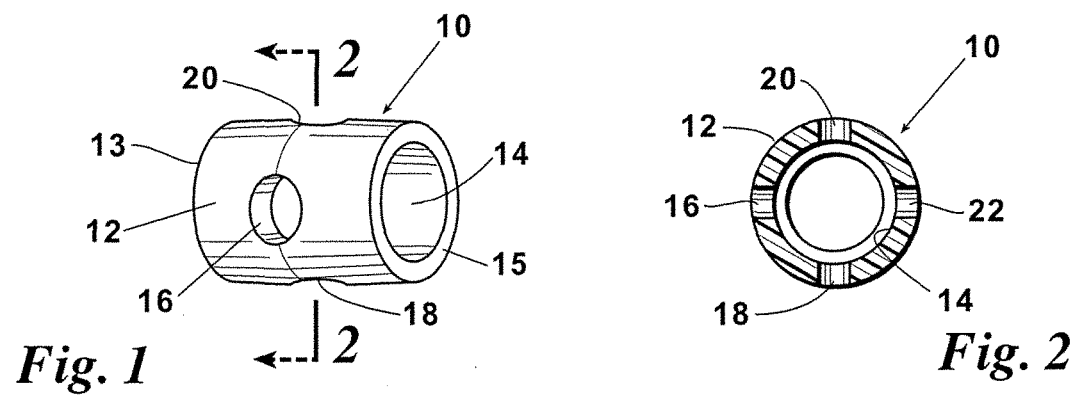
*Fig. 1*
*Fig. 2*
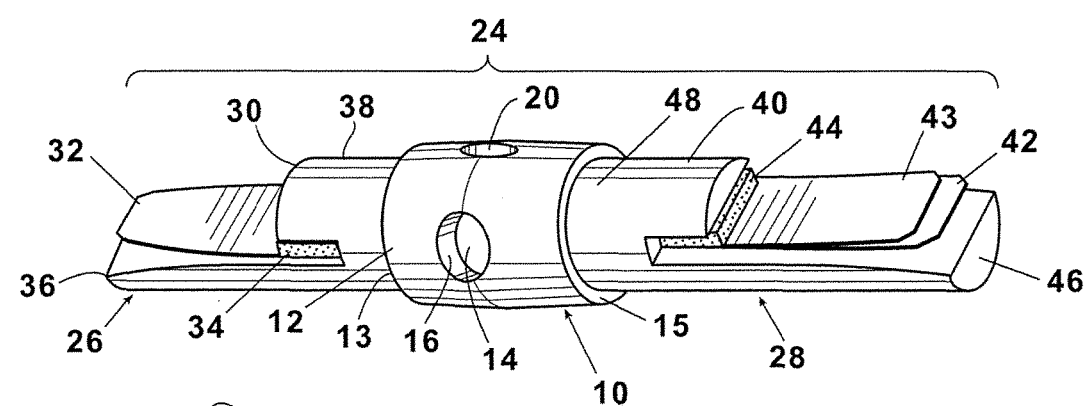
*Fig. 3*
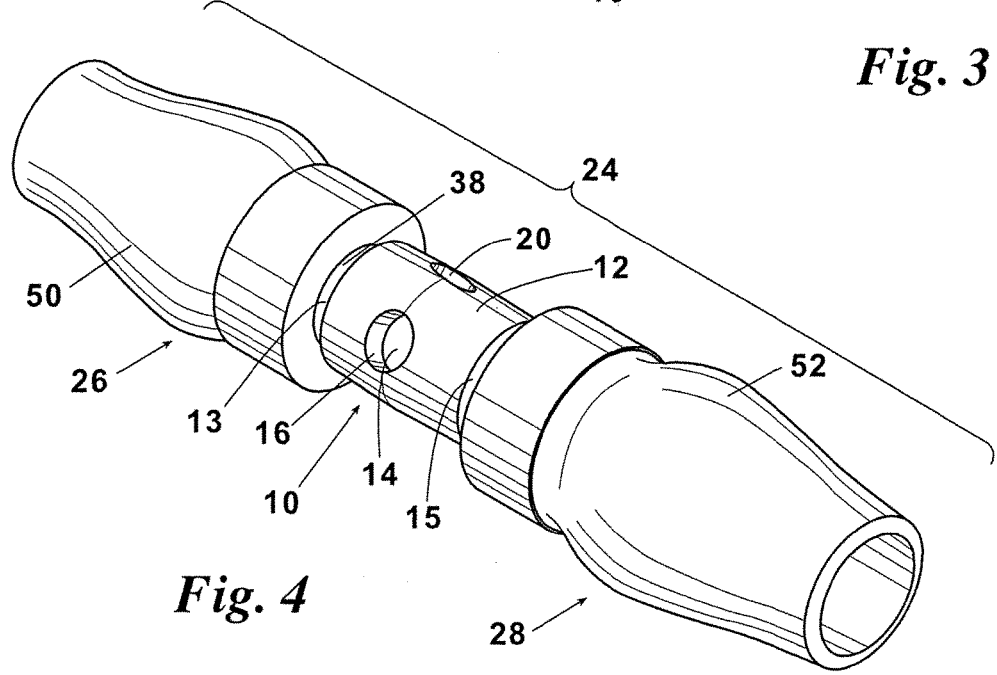
*Fig. 4*

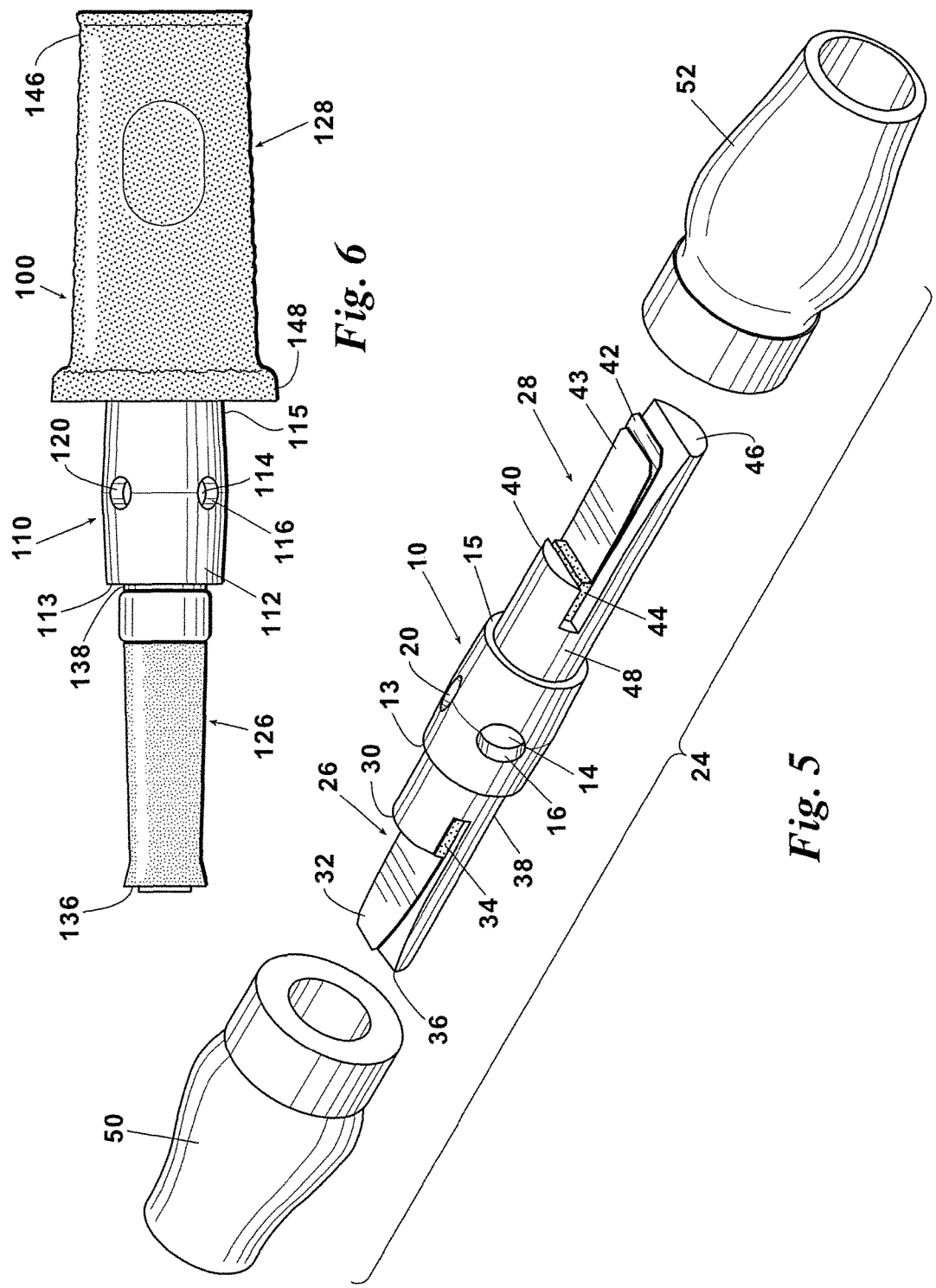

ACOUSTIC COUPLER FOR A COMBINED GAME CALL

CROSS REFERENCE TO RELATED APPLICATION

This application claims the benefit of U.S. Provisional Application No. 62/388,090 filed Jan. 19, 2016, herein incorporated by reference in its entirety for all purposes.

FIELD OF THE INVENTION

The present invention relates to animal calls generally and particularly to combined animal calls.

BACKGROUND OF THE INVENTION

Game calls are known to be useful and effective for the purpose of attracting animals either in the context of hunting or by animal enthusiasts to either study, observe, enjoy or photograph all types of animals in their native environment. Game calls are intended to simulate the sounds produced by the species of animal the hunter or observer wishes to attract or alternatively may be simulated to the sound of the animal's prey, mate, or the like. Game calls have been found to be effective in drawing such animals to the hunter or observer who is typically camouflaged or concealed from visual inspection by the animal.

It is common for observers and particularly hunters to employ multiple different types of game calls in a single outing as one may turn out to be more effective than another. In the case of birds or waterfowl, it is often necessary to carry multiple game calls each designed to attract a particular and distinct species of bird or waterfowl.

A known problem encountered is the need to carry multiple such calls which are commonly carried on a lanyard around the neck of the user or in the user's pocket or pack. The sheer number of distinct calls often becomes distracting and burdensome simply by their bulk. Due to the number, a particular call may become separated and lost without the user's knowledge. An additional known problem is that the hunter or observer may desire to quickly access a particular call which is commonly not immediately visible requiring the user to search or rummage through the various calls in order to select the desired type. It is known that a hunter or observer may miss an opportunity to attract a particular species of animal because the hunter or observer was unable to quickly or accurately select a particular required call. A need therefore exists in the art for an apparatus which will reduce the number of distinct calls required to be carried by the hunter or observer. An additional need exists for an apparatus which reduces the effort and time spent by the user searching for a particular desired game call.

SUMMARY OF THE INVENTION

The present invention relates to an acoustic coupler designed to be placed between two sound boards, such as, for example, two separate and distinct animal reed call inserts. The term "reed call" or "reed game call" shall be defined herein to include any type of game or predator call wherein the user blows air into one portion of the call which passes across a reed or other such sound producing member and then exits, typically through a passage, so as to simulate the sound emitted naturally by an animal's prey, predator, potential mate, species or the like.

The acoustic coupler of the present disclosure includes a body, an acoustic cavity, and exhaust ports, or apertures. The body includes a length and the acoustic chamber extends the interior length of the body. The exhaust ports or apertures are positioned (drilled) through the exterior of the body into the acoustic chamber. The ends (a first end and a second end) of the body are configured to each receive a different sound board or reed call insert therein. The apertures allow sound to exit the acoustic chamber. Each reed call segment includes a proximal end and a distal end such that the distal end may be truncated and connected to the common exhaust trough/acoustic chamber such that the distal end of one individual reed call segment can be inserted and connected to each respective end of the body.

A user blowing into a respective reed call segment in a known manner produces sound which enters the acoustic chamber and exits through the apertures. Alternately, the call could be reversed so that the user blows into the opposite connected reed call segment to produce a different and distinct game call sound. As a result, a single, versatile, apparatus is provided which allows for combined reed game call segments to be connected in a single unit via the acoustic coupler of the present disclosure. In this way, the number of separate reed game calls required to be carried (typically around the neck on a lanyard) by the user is greatly reduced. In addition, the user does not have to search among a multitude of reed calls to find a desired call thus making the process of calling animals easier, quicker, and more efficient.

The present disclosure includes an acoustic coupler for combining at least two independent reed game calls. The acoustic coupler has a body including a first length bounded by a first end and a second end. The body includes an acoustic chamber therein and at least one aperture extending into the acoustic chamber. The first end and said second end of the body are in fluid communication with the acoustic chamber and each include openings dimensioned to receive one of the two or more independent reed game calls.

A combined reed game call including an acoustic coupler. The acoustic coupler includes a body having a length bounded by a first end and a second end. The body includes an exterior and an acoustic chamber. The body includes at least one aperture extending from the exterior into the acoustic chamber. The first end and second end are in fluid communication with the acoustic chamber. The first reed game call having an insert including a proximal end and a distal end is affixed to the first end of the body. The insert in the first reed game call includes an air passage through its distal end which is in fluid communication with the acoustic chamber. A second reed game call having an insert includes a proximal end and a distal end affixed to the second end of the body. The insert in the second reed game call includes an air passage through its distal end which is in fluid communication with the acoustic chamber.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

BRIEF DESCRIPTION OF THE DRAWINGS

FIG. 1 depicts a perspective view of the acoustic coupler of the present disclosure.

FIG. 2 is a view taken along lines 2-2 of FIG. 1.

FIG. 3 is a perspective view of an embodiment of the acoustic coupler of the present disclosure including a single reed call segment and a double reed call segment forming a combined game call.

FIG. 4 is a perspective view of the combined game call of FIG. 3 fully assembled.

FIG. 5 is a perspective exploded view of the game call of FIG. 4.

FIG. 6 is a perspective view of an alternate embodiment combined reed game call including the acoustic coupler of the present disclosure.

DETAILED DESCRIPTION OF THE PREFERRED EMBODIMENTS

With reference to the drawings, FIG. 1 in combination with FIG. 2 depict acoustic coupler 10 of the present disclosure in a preferred arrangement, acoustic coupler 10 includes a body 12, an interior acoustic chamber 14, and a plurality of apertures 16, 18, 20, and 22 (FIG. 2) preferably positioned around the circumference of body 12.

In the preferred arrangement, body 12 is cylindrical in its external geometry. A cylindrical geometry may be preferred by a user so that the user can grip the body in the user's hand, typically in a clenched transverse arrangement. However, it will be apparent to one of skill in the art that alternate external geometries are possible and contemplated such as square/rectangular, truncated, square, oval, etc.

In the preferred arrangement, body 12 may be constructed of chlorinated polyvinyl chloride (CPVC). CPVC is a suitable material due to its ease of use, flexibility, cost, and acoustic properties. It should be understood, however, that other thermoplastics are contemplated such as polyvinyl chloride (PVC), polycarbonate, acrylic, nylon and others, without limitation. In addition, other materials are contemplated such as metals (for example aluminum) or natural materials (such as wood). Acoustic coupler 10 could be molded or painted to any desired color.

Acoustic chamber 14 preferably extends the length of the interior of body 12 between a first end 13 and a second end 15 or in fluid communication with first end 13 and second end 15, such that first end 13 and second end 15 of body 12 are open (in fluid communication) to each receive a reed call insert at each end 13 and 15 as discussed further below with regard to FIG. 3. The geometry of the open ends at 13 and 15 may be determined by the type of reed call insert selected. Acoustic chamber 14 receives and amplifies the sound produced by the reed call inserts. The combination of the size of acoustic chamber 14, number and size of the apertures (such as 16, 18, 20, and 22) and the wall thickness of body 12 can be modified as desired to suitably affect the volume and tone of the audible signal produced from acoustic chamber 14.

Apertures 16, 18, 20, and 22 are preferably positioned equidistant around the cylindrical circumference of body 12 and preferably approximately midway between first end 13 and second end 16 of the length of body 12. It should be understood, however, that the four apertures 16, 18, 20, and 22 depicted in the embodiments of FIGS. 1 and 2 are preferred. Additional or fewer apertures could be substituted as desired and sufficient to effect sound emitted from acoustic chamber 14. The diameter of the apertures could also be modified as desired. Apertures 16, 18, 20, and 22 are preferably round, however other geometries are contemplated.

For the purpose of exemplification and not limitation, sample suitable dimensions of acoustic coupler 10 are as follows:

TABLE 1

| Component | Range | Preferred |
| --- | --- | --- |
| Body Length | 1"-1.5" | 1.25" |
| Body Wall Thickness | 0.10"-0.25" | 0.10" |
| Acoustic Chamber Diameter | 0.5"-0.8" | 0.6" |
| Aperture Diameter | 0.25"-.375" | 5/16" |

Reference is next made to FIG. 3 in combination with FIGS. 4 and 5. FIG. 3 depicts a partial combined reed game call 24 of a particular embodiment including a first reed call segment 26 and a second reed call segment 28 mated together through acoustic coupler 10. FIG. 5 depicts an exploded view of game call 24 and FIG. 4 depicts an assembled combination call 24. Single reed calls and double reed calls each have unique known advantages and disadvantages such that a hunter or wildlife observer may desire both in a combined call using the acoustic coupler of the present disclosure.

In one preferred embodiment, a single reed duck call segment 26 is mated to a double reed duck call segment 28 through acoustic coupler 10. Single reed duck calls, such as segment 26 and double reed duck calls such as segment 28 are known in the art. Suitable segments are available commercially from sources such as Grassy Creek Game Calls, 21523 State Hwy 156, Ewing, Mo. 63440 and Brookside Game Calls, 224 N. Weaver Street, Tower City, Pa. 17980 as well as other sources.

Single reed duck call segment 26 includes an insert 30, a single reed 32 and a retainer block 34. Single reed call segment 26 includes a proximal end 36 and a distal end 38. Single reed call segment 26 is constructed and operates as is known in the art with the exception that its distal end 38 is truncated and inserted into first end 13 of body 12 of acoustic coupler 10. As such, it is evident that the geometry and diameter of distal end 38 preferably matches the selected geometry and diameter of the opening in first end 13 of body 12 such that distal end 38 fits snuggly and is sealed therein to prevent the escape of air. Distal end may be secured in a known manner such as friction fit or with adhesive such as epoxy. Distal end 38 of single reed call segment 26 therefore extends into acoustic chamber 14 of acoustic coupler 10.

Opposite single reed duck call 26 and separated by acoustic coupler 10 is a double reed duck call 28. Double reed duck call 28 may be also constructed as known in the art to include an insert 40, a first reed 42, and a second reed 43 (thereby together a double reed embodiment) which are retained in insert 40 by a retainer block 44. Double reed call segment 28 includes a proximal end 46 and a distal end 48. Double reed call segment 28 is constructed and operates as is known in the art with the exception that distal end 48 is truncated and inserted into second end 15 of body 12 of acoustic coupler 10. As such, it is evident that the geometry and diameter of distal end 48 preferably matches the selected geometry and diameter of the opening in second end 15 of body 12 such that distal end 48 fits snuggly and is sealed therein to prevent the escape of air. Distal end 48 may be secured in a known manner such as by friction fit or through the use of adhesive (epoxy) for example. Distal end 48 of double reed call segment 28 therefore extends into acoustic chamber 14 of acoustic coupler 10.

Distal end 38 of single reed call segment 26 and distal end 48 of double reed call segment 28 are preferably inserted into acoustic chamber 14 so as to provide a seal but not so far as to interfere with air and sound exiting apertures 16, 18, 20, and 22. In an alternate embodiment, acoustic coupler 10 could be molded as a single piece with a first call insert such as single reed call segment 26 and a second call insert such as double reed call segment 28.

FIG. 4 depicts combined call 24 fully assembled such that a barrel 50 is positioned over single reed segment 26 in a conventional manner. In operation, air is blown into the end of barrel 50 in order to actuate single reed 32 in a known manner to produce a desired sound intended to approximate a live duck. The air actuating reed 32 then passes through insert 30 exiting at distal end 38 into (in fluid communication with) acoustic chamber 14 and out through apertures 16, 18, 20, and 22. Acoustic chamber 14 also receives the sound produced from reed 32 and thereby provides the requisite chamber to produce the desired acoustic sound (duck quack), including without limitation, desired tone, volume, pitch and the like. Apertures 16, 18, 20, and 22 could be covered by the fingers of the user in a known manner to alter the acoustic effect emanating from acoustic chamber 14. Apertures 16, 18, 20, and 22 could be covered by the fingers of the user in a known manner to alter the acoustic effect emanating from acoustic chamber 14.

FIG. 4 also depicts combined call 24 fully assembled such that a barrel 52 is positioned over double reed segment 28. In operation, air is blown into the end of barrel 52 in order to actuate reeds 42 and 43 in a known manner to produce a desired sound intended to approximate a live duck. The air actuating reeds 42 and 43 passes through insert 40 exiting at its distal end 48 (in fluid communication with) into acoustic chamber 14 and out through aperture 16, 18, 20, and 22. Acoustic chamber 14 also receives the sound produced from reeds 42 and 43 and thereby provides the requisite chamber to produce the desired acoustic sound (duck quack) to include without limitation, tone, volume, pitch, and the like. Apertures 16, 18, 20, and 22 could be covered by the fingers of the user in a known manner to alter the acoustic effect emanating from acoustic chamber 14.

A lanyard could be connected around body 12 to allow the combined call to be worn (supported) around the neck of the user.

With reference to FIG. 6, an alternate embodiment combined game call 100 is depicted. Alternate embodied game call 100 includes a combination of elk calf reed call segment 126 and elk cow reed call segment 128. Alternate embodiment combined game call 100 also includes an acoustic coupler 110 of the present disclosure. Acoustic coupler 110 may be substantially the same as acoustic coupler 10 of FIG. 1 except in this embodiment, the length of acoustic coupler 110 may be slightly longer and apertures 116 and 120 smaller in diameter. These changes may affect the sound emanating from acoustic chamber 114 such that the tone may be deeper and sound quieter as may be desired for attracting a different type of animal.

Elk calf reed call segment 126 may be constructed in a manner known in the art and includes a proximal end 136 and a distal end 138 such that distal end 138 is truncated and inserted into first end 113 of body 112 of acoustic coupler 110. Likewise and alternately, elk cow reed call segment 128 may be designed in a manner known in the art and include a proximal end 146 and a distal end 148 such that distal end 148 is truncated and inserted into second end 115 of body 112 of acoustic coupler 110. Sound is produced by either elk calf reed call segment 126 or elk cow reed call segment 128 in a known manner by either blowing into the end of elk calf reed call segment 126 or elk cow reed call segment 128 as described above with regard to call 24.

Additional combination calls are contemplated with the possible combinations being nearly limitless. For example, alternate embodiments may include a turkey call which includes an owl hooter segment attached to one end of an acoustic coupler of the present disclosure and a crow call attached to the second end of the acoustic coupler. In a deer embodiment, combinations of a buck reed call segment may be attached to an acoustic coupler of the present disclosure at a first end and a doe reed call segment on the second end. Either the buck or the doe reed call segments could be replaced with a fawn reed call segment as desired. For a predator call, a rabbit reed call segment may be attached to the first end of an acoustic coupler for long-range calling of a predator and a mouse reed call segment could be attached to a second end of the acoustic coupler for close call requirements. In alternative embodiments for duck calls, a mallard duck reed call segment could be affixed to a first end of an acoustic coupler and a wood duck reed call affixed to the second end. Alternately, a goose reed call segment could be affixed to a first end of an acoustic coupler segment and a duck reed call segment could be attached to the second end of the acoustic coupler. As would be understood by a person having skill in the art, the possible combinations are extensive.

The embodiments herein and the various features and advantageous details thereof are explained more fully with reference to the non-limiting embodiments that are illustrated in the accompanying drawings and detailed in the following description. Descriptions of well-known components and processes and manufacturing techniques are omitted so as to not unnecessarily obscure the embodiments herein. The examples used herein are intended merely to facilitate an understanding of ways in which the invention herein may be practiced and to further enable those of skill in the art to practice the embodiments herein. Accordingly, the examples should not be construed as limiting the scope of the claimed invention.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. An acoustic coupler for combining and producing sound from at least two independent reed game calls, comprising:
    a body including a first length bounded by a first end and a second end;
    said body including an interior acoustic chamber;
    said body including at least one aperture extending into said acoustic chamber on said first length;
    said first end and said second end being in fluid communication with said acoustic chamber;
    said first end and said second end each including openings dimensioned to receive one of the two or more independent reed game calls;
    said acoustic chamber being sized and the number and size of said at least one aperture being selected so as to combine to receive and amplify the sound produced by said reed game calls.

2. The acoustic coupler of claim 1 wherein said body includes a generally cylindrical geometry having a circumference.

3. The acoustic coupler of claim 2 wherein said at least one aperture is positioned on said circumference.

4. The acoustic coupler of claim 3 further including a plurality of apertures positioned around said circumference.

5. The acoustic coupler of claim 4 wherein said plurality of apertures are positioned equidistant around said circumference.

6. The acoustic coupler of claim 1 wherein the at least two reed game calls include at least one single reed game call and at least one double reed game call.

7. The acoustic coupler of claim 1 wherein the at least two reed game calls include at least one elk calf reed game call and at least one elk cow reed game call.

8. The acoustic coupler of claim 1 wherein the at least two reed game calls include at least one owl hooter reed game call and at least one crow reed game call.

9. The acoustic coupler of claim 1 wherein the at least two reed game calls include at least one duck reed call and at least one goose reed game call.

10. A combined reed game call, comprising:
    an acoustic coupler including a body having a length bounded by a first end and a second end;
    said body including an exterior and an interior acoustic chamber;
    said body including at least one aperture extending from the exterior into said acoustic chamber along said length;
    said first end and said second end being in fluid communication with said acoustic chamber;
    a first reed game call having an insert including a proximal end and a distal end affixed to said first end;
    said insert in said first reed game call including an air passage through said distal end in fluid communication with said acoustic chamber;
    a second reed game call having an insert including a proximal end and a distal end affixed to said second end;
    said insert in said second reed game call including an air passage through said distal end in fluid communication with said acoustic chamber;
    said acoustic coupler combining and producing sound from said first reed game call or said second reed game call;
    the combination of the size of said acoustic chamber and the number and size of said at least one aperture being sufficient so as to receive and amplify said sound produced by said first reed game call or said second reed game call.

11. The combined reed game call of claim 10 wherein said exterior of said body is cylindrical having a circumference.

12. The combined reed game call of claim 11 further including a plurality of apertures positioned equidistant around the circumference.

13. The combined reed game call of claim 10 wherein said first reed game call is a single reed duck call.

14. The combined reed game call of claim 13 wherein said second reed game call is a double reed duck call.

* * * * *